(12) United States Patent
Powell

(10) Patent No.: US 9,309,911 B1
(45) Date of Patent: Apr. 12, 2016

(54) CAP NAIL

(71) Applicant: K & R INDUSTRIES INC., Sugar Hill, GA (US)

(72) Inventor: Kenneth S. Powell, Lawrenceville, GA (US)

(73) Assignee: K & R INDUSTRIES INC., Sugar Hill, GA (US)

( * ) Notice: Subject to any disclaimer, the term of this patent is extended or adjusted under 35 U.S.C. 154(b) by 0 days.

(21) Appl. No.: 14/596,962

(22) Filed: Jan. 14, 2015

Related U.S. Application Data

(63) Continuation of application No. 13/355,899, filed on Jan. 23, 2012, now abandoned.

(51) Int. Cl.
| | |
|---|---|
| *E04B 5/00* | (2006.01) |
| *F16B 15/00* | (2006.01) |
| *E04D 5/14* | (2006.01) |
| *E04D 3/36* | (2006.01) |
| *E04B 1/76* | (2006.01) |

(52) U.S. Cl.
CPC ............... *F16B 15/00* (2013.01); *E04D 5/146* (2013.01); *E04B 1/7633* (2013.01); *E04D 3/3603* (2013.01); *E04D 3/3606* (2013.01); *E04D 5/145* (2013.01)

(58) Field of Classification Search
CPC ..... E04D 5/145; E04D 3/3603; E04D 3/3606; E04D 5/146; E04B 1/7633; F16B 15/00
USPC ................. 52/410; 411/368, 383, 387, 387.6, 411/387.7
See application file for complete search history.

(56) References Cited

U.S. PATENT DOCUMENTS

| | | | |
|---|---|---|---|
| 2,712,261 A | * | 7/1955 | Anderson ................ 411/487 |
| 3,003,386 A | | 4/1958 | Snyder |
| 3,495,315 A | * | 2/1970 | Waeltz ........................ 29/782 |
| 2,674,149 A | | 3/1972 | Benson |
| D252,851 S | | 9/1979 | Church |
| 4,361,997 A | | 12/1982 | DeCaro |
| 4,380,413 A | | 4/1983 | Dewey |

(Continued)

FOREIGN PATENT DOCUMENTS

FR    2675529 A    12/1991

OTHER PUBLICATIONS

2009 Supplement to the 2007 Florida Building Code, Test Protocols for High-Velocity Hurricane Zone, Mar. 1, 2009.

(Continued)

*Primary Examiner* — Basil Katcheves
*Assistant Examiner* — Joshua Ihezie
(74) *Attorney, Agent, or Firm* — Brooks Kushman P.C.

(57) ABSTRACT

A flexible roofing fastener is provided for securing water resistant material to a substrate such as wood and preventing leaks through holes created in the material by the roofing fastener. The roofing fastener includes a resilient disk having a flat lower surface, a thick central region and an annular region having a thickness that tapers downwardly from a central area toward a periphery. The disk central region has a plurality of evenly spaced apart flat-headed nails extending downwardly there through. The annular region having plurality of holes through which sealing material can flow. A flexible disk, when upload flexes in a cup shape causing wedge effect on the anchoring points in the substrate, allowing this fastener to perform better when under a simulated wind uplift testing of various modified bitumen Roof Systems.

20 Claims, 4 Drawing Sheets

(56) References Cited

U.S. PATENT DOCUMENTS

| | | | | |
|---|---|---|---|---|
| 4,455,804 A * | 6/1984 | Francovitch | ............. | 52/698 |
| 4,476,660 A * | 10/1984 | Francovitch | ............. | 52/515 |
| 4,581,964 A * | 4/1986 | Takatsuru | ............. | 81/464 |
| 4,617,771 A * | 10/1986 | Tomaszewski | ............. | 52/410 |
| 4,620,402 A * | 11/1986 | Beneze | ............. | 52/410 |
| 4,627,207 A * | 12/1986 | Young et al. | ............. | 52/361 |
| 4,641,472 A * | 2/1987 | Young et al. | ............. | 52/361 |
| 4,726,164 A * | 2/1988 | Reinwall et al. | ............. | 52/410 |
| 4,780,039 A * | 10/1988 | Hartman | ............. | 411/531 |
| 4,788,807 A * | 12/1988 | Whitman | ............. | 52/410 |
| 4,852,323 A * | 8/1989 | Kartfilt | ............. | 52/410 |
| 4,915,561 A * | 4/1990 | Buhri et al. | ............. | 411/439 |
| 4,959,938 A | 10/1990 | DeCaro | | |
| 4,987,714 A * | 1/1991 | Lemke | ............. | 52/410 |
| 4,999,963 A * | 3/1991 | Verble | ............. | 52/410 |
| 5,035,028 A * | 7/1991 | Lemke | ............. | 24/336 |
| 5,069,589 A * | 12/1991 | Lemke | ............. | 411/533 |
| 5,118,235 A * | 6/1992 | Dill | ............. | 411/368 |
| 5,171,116 A * | 12/1992 | Gerhardt et al. | ............. | 411/368 |
| 5,171,118 A * | 12/1992 | Rothenbuhler | ............. | 411/480 |
| 5,217,339 A | 6/1993 | O'Connor et al. | | |
| 5,244,088 A * | 9/1993 | Musil | ............. | 206/338 |
| 5,407,313 A | 4/1995 | Bruins et al. | | |
| 5,634,756 A * | 6/1997 | Losada | ............. | 411/441 |
| 5,709,059 A * | 1/1998 | Murphy et al. | ............. | 52/410 |
| 5,778,623 A * | 7/1998 | Powell | ............. | 52/410 |
| 5,867,958 A * | 2/1999 | Ditka et al. | ............. | 52/410 |
| 5,934,855 A * | 8/1999 | Osterle et al. | ............. | 411/545 |
| 5,951,225 A * | 9/1999 | Osterle et al. | ............. | 411/545 |
| 6,095,737 A | 8/2000 | Barker et al. | | |
| 6,145,272 A | 11/2000 | Tomaini | | |
| 6,233,889 B1 * | 5/2001 | Hulsey | ............. | 52/302.1 |
| 6,282,857 B1 * | 9/2001 | Rubenacker | ............. | 52/410 |
| 6,308,483 B1 * | 10/2001 | Romine | ............. | 52/410 |
| 6,406,243 B1 * | 6/2002 | Kolodziej et al. | ............. | 411/533 |
| 6,565,303 B1 * | 5/2003 | Riccitelli et al. | ............. | 411/533 |
| 6,665,991 B2 | 12/2003 | Hasan | | |
| 6,779,959 B1 * | 8/2004 | Yang | ............. | 411/443 |
| 6,783,048 B2 * | 8/2004 | Powell | ............. | 227/113 |
| 7,413,392 B2 | 8/2008 | Nebesnak et al. | | |
| 7,516,841 B2 * | 4/2009 | Uejima et al. | ............. | 206/338 |
| 7,631,468 B2 * | 12/2009 | Gong et al. | ............. | 52/410 |
| 7,654,389 B2 * | 2/2010 | Vogrig et al. | ............. | 206/338 |
| D636,503 S * | 4/2011 | Parziale et al. | ............. | D25/199 |
| 8,166,720 B2 | 5/2012 | Garrigus et al. | | |
| 2003/0196398 A1 * | 10/2003 | Hasan | ............. | 52/410 |
| 2004/0148888 A1 * | 8/2004 | Kuhn et al. | ............. | 52/410 |
| 2004/0168396 A1 | 9/2004 | Kuhn et al. | | |
| 2004/0170489 A1 * | 9/2004 | Nebesnak et al. | ............. | 411/396 |
| 2005/0183348 A1 | 8/2005 | Kuhn et al. | | |
| 2005/0196253 A1 | 9/2005 | Nebesnak et al. | | |
| 2005/0246971 A1 * | 11/2005 | Ortega | ............. | 52/90.1 |
| 2006/0099370 A1 * | 5/2006 | Glass | ............. | 428/40.1 |
| 2007/0175170 A1 * | 8/2007 | Shah | ............. | 52/741.1 |
| 2009/0000239 A1 * | 1/2009 | Hamlin, III | ............. | 52/741.4 |
| 2009/0173028 A1 * | 7/2009 | Garrigus et al. | ............. | 52/410 |
| 2011/0305542 A1 * | 12/2011 | Lat et al. | ............. | 411/443 |
| 2012/0298716 A1 * | 11/2012 | Segura | ............. | 227/135 |
| 2013/0009025 A1 * | 1/2013 | Stearns | ............. | 248/237 |

OTHER PUBLICATIONS

Concrete and Clay Roof Tile Installation Manual, Florida Roofing, Sheet Metal and Air Conditioning Contractors Association, Inc. (FRSA), Tile Roofing Institute, Copyright 2001.

Texas Department of Insurance, Engineering Services/MC 103-3A, Product Evaluation RC-28, Effective Jul. 29, 1998, Revised Mar. 1, 2001.

Non-Final Office Action, related U.S. Appl. No. 13/355,899 dated Mar. 14, 2013.

Final Office Action, related U.S. Appl. No. 13/355,899 dated Aug. 14, 2013.

Non-Final Office Action, related U.S. Appl. No. 13/355,899 dated Dec. 13, 2013.

Final Office Action, related U.S. Appl. No. 13/355,899 dated Jul. 14, 2014.

Journal of Light Construction, "Built-Up Hot-Mop Roofing" by David Lopez, Dated Feb. 2005.

* cited by examiner

CAP NAIL

CROSS-REFERENCE TO RELATED APPLICATIONS

This application is a continuation of U.S. application Ser. No. 13/355,899 filed Jan. 23, 2012, the disclosure of which is hereby incorporated in its entirety by reference herein.

BACKGROUND OF THE INVENTION

1. Field of the Invention

The present invention relates generally to a roofing fastener having a disk that distributes pressure over greater areas than do heads of nails alone when used to secure sheets of water-resistant materials to substrates such as wood and more specifically to roofing fasteners having resilient disks configured to moderate pressures along their peripheral edges to prevent damage to the material being supported by the roofing fasteners while preventing leaks through holes created in the material by the roofing fasteners.

2. Background Art

Roofing components are applied to the top of roofs for several reasons. First, the roofing materials prevent moisture from reaching an underlying support member such as concrete or plywood. Also, roofing materials serve to insulate a building from the outdoors.

With respect to underlying support members which are made of plywood or OSB, plywood, and about ½" to ¾" inches thick, a base ply sheet of felt-like material of fiberglass or organic material is commonly placed over the plywood. Roof fasteners are then installed through the base ply and into the plywood to hold the base ply to the support member. A layer of molten asphalt is then poured or brushed over the base ply and roofing fasteners. In some instances, a second layer of base ply sheets are placed over the first layer of asphalt while the asphalt it still hot. The asphalt thus holds the first and second layers of base ply sheet together.

In the event of high winds, it is important that the combination of the base ply sheet and asphalt be strongly anchored to the underlying roof substrate. With high winds, such as might accompany hurricanes, large relatively low-pressure conditions can be created above the asphalt/base ply roofing materials. This wind or low pressure can rip the asphalt/base ply sheet roofing materials off the underlying roofing substrate if not sufficiently anchored.

A common type of roofing fastener used today to hold plywood and asphalt roof materials to a roofing substrate is a nail with a disc 1" to 1⅝ inches in diameter having a generally flat head. The fastener is pounded into the base ply and plywood. The nail penetrates the plywood and secures the disk, therefore securing the base-sheet to the plywood.

These cap nails have drawbacks. Often, they have limited capacity to secure the base sheet, because they will only provide 50-100 pounds of resistance. Tear out strength test results conducted on these roofing fasteners installed in plywood vary greatly from fastener to fastener due to inconsistency of plywood. Moreover, due to increasing losses in the insurance industry, pull out requirements for fasteners have been revised upward. Often these cap nails fail to meet the new and higher industry standards. Typically, these cap nails have pullout strength of about 50-100 pounds.

Problems exist with other fasteners as well. A roofing nail with a 1⅝" metal disk adjacent to its head, have limited pull out rupture strength typically in the range of 70 to 100 pounds. Multiple component fasteners are also used which include a retaining disk with a central aperture, which receives a threaded fastener. This multiple piece construction increases the cost of making the fastener and complexity of installation. Further, even these multiple component fasteners also have difficulty in meeting today's desire for providing higher load values without pulling out or tearing the roofing material.

The present invention is intended to address deficiencies found in these above-described conventional fasteners.

SUMMARY

A roofing fastener is provided for nondestructively securing water resistant membrane material to a substrate; such as wood roof decking and preventing leaks through holes created in the membrane material by the roofing fastener. The roofing fastener includes a resilient, disk having a flat lower surface. The roofing fastener also includes a plurality of nails having an elongate, metal, senate shank bearing a flat head at a first end and a point at the second end. The second end and the shank of each nail extend fixedly downwardly through evenly spaced apart apertures formed in the disk central region having a sized to securely grip the nail. An annular region having plurality of openings there through sized to allow roof adhesive to pass there through surrounds the disk central region. The disk is formed of a tough resilient plastic material. A flexible disk, which has more than one anchoring point, which flexes in a cup shape causing wedge effect on the anchoring point in the substrate, allows this fastener to perform 300% better than the standard cap nail.

DETAILED DESCRIPTION OF THE PREFERRED EMBODIMENT

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
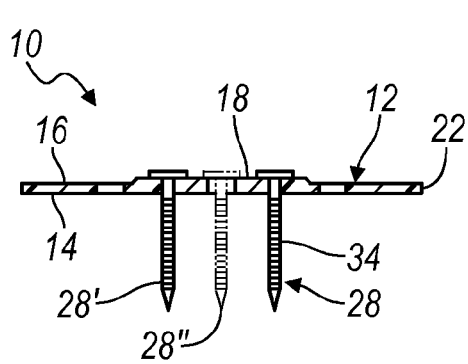
FIG. 1 is a side, sectional view of a roofing fastener, taken along the section line 1-1 of FIG. 2, with the roofing fastener disk in an unattached, uncurled configuration.
Figure 2:
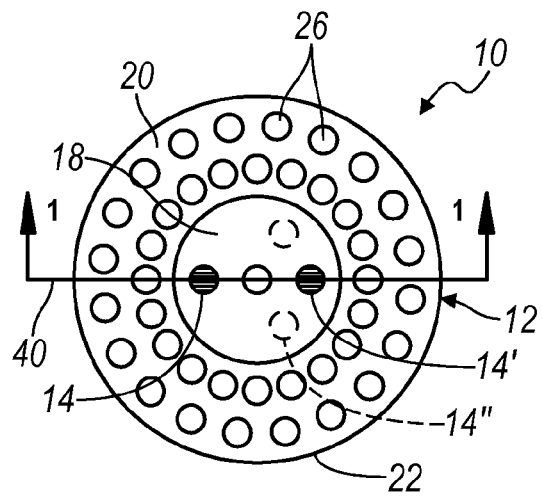
FIG. 2 is a plan view of the disk of the roofing fastener of FIG. 1 and illustrates a web bridging an exemplary, secondary opening in the roofing fastener disk.

FIG. 1 shows a side, sectional view of a first roofing fastener embodiment 10, taken along the section line 1-1 of FIG. 2. The roofing fastener 10 comprises a disk 12 having a flat lower surface 14 and has a generally flat upper surface 16. Disk 12 has a relatively thick central region 18 surrounded by an annular region 20 which preferably tapers downwardly from the central region 18 toward a periphery 22. The disk is formed of one of a tough flexible plastic material such as nylon, Lexan, acrylics and/or flexible metals or mixture of metals; such as tin, aluminum, zinc etc. The illustrated embodiment is formed of impact modified Nylon 66.

Figure 2A:
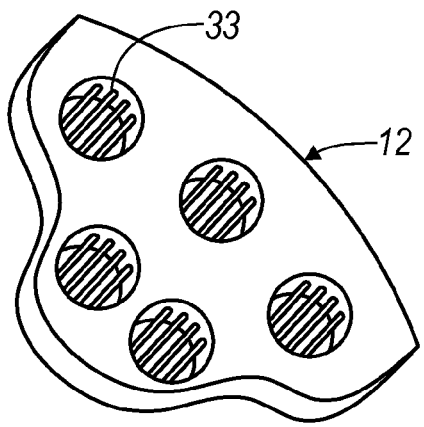
FIG. 2A is an enlarged fragmentary view of an alternative roofing fastener hole structure.
Figure 3:
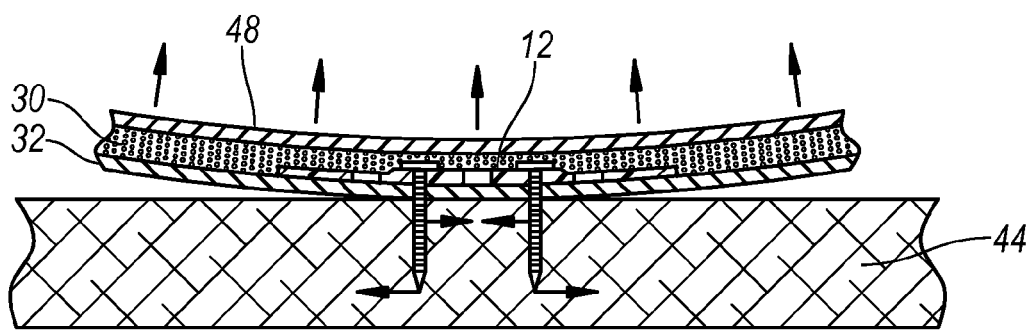
FIG. 3 is a side, sectional view of the roofing fastener of FIG. 1, shown attached through a water-resistant material to a wooden substrate under an upward wind load with deflection exaggerated for illustration purposes.

Extending through the central region 18 of the disk 12 is a plurality of evenly spaced apart apertures 24. The annular region 20 is provided with a series of holes 26. Apertures 24 receive and firmly support a plurality of nails 28 and 28'. The series of holes 26 contribute to the flexibility of the disk 12 and enable an adhesive 30, such as asphalt or tar, to flow through the holes 26 and adhere to a water-resistant first layer of roofing material 32 as shown in FIG. 3 such as roofing felt or tar paper disposed below. Optionally, each the series of holes 26 provided with one or more webs 33 spanning the holes as shown in FIG. 2A allowing sealing material to flow through the holes 26 while preventing the tip of a nail of another roofing fastener from becoming entangled therein pro to use or when shipped in bulk.

The nails 28 and 28' extend downwardly through apertures 24 the central region 18 in a perpendicular manner. The diameter of apertures 24 are slightly smaller than the diameter of the nail shank 34 to retain the nail 28, once inserted. Apertures 24 can be preformed when the disk is molded or formed in situ as the nails are driven through the central region 18. The nails 28 have a shank 34 with a flat head 36 located at a first end and a point 38 located at an opposed second end. The nail head 36 is preferably of the flat head design, and the shank 34 is preferably serrated to form a ringed shank or a screw shank.

FIG. 2 is a plane view of the first roofing fastener embodiment 10 illustrating the positions of the central region 18, nails 28 and 28' and of a typical arrangement of holes 26 in annular region 20. Also shown is the disposition of the centerline 40.

FIG. 3 is a cross-sectional side view of the roofing fastener 10 attached to a substrate 44 and shows the disk 12 in a curled, partially inverted configuration as it would appear when being flexed by an upward wind load. The inversion of the disk 12, which is exaggerated for illustration purposes, moderates shear forces applied to the multilayer roof system 42 by the peripheral edge 22 of the disk 12, reducing the likelihood of the first layer of roofing material 30 being damaged by the peripheral edge of the disk.

The illustrated multilayer roof system 42 has first layer 32 applied directly over the roof deck 44 and affixed thereto by a series of roofing fasteners 10. On top of the first layer 32 held to the roof deck 44 by roofing fasteners 10 is a layer of roofing adhesive 30 such as tar or other roof sealant is applied. The roof adhesive penetrates through the holes 26 in a disk and bonds to the first layer 32. A second membrane 48 is applied over the adhesive layer to form a water impervious multilayer roof system 42. An example of a roof system of this type is referred to a 30/90 hot mop roof.

Figure 6:
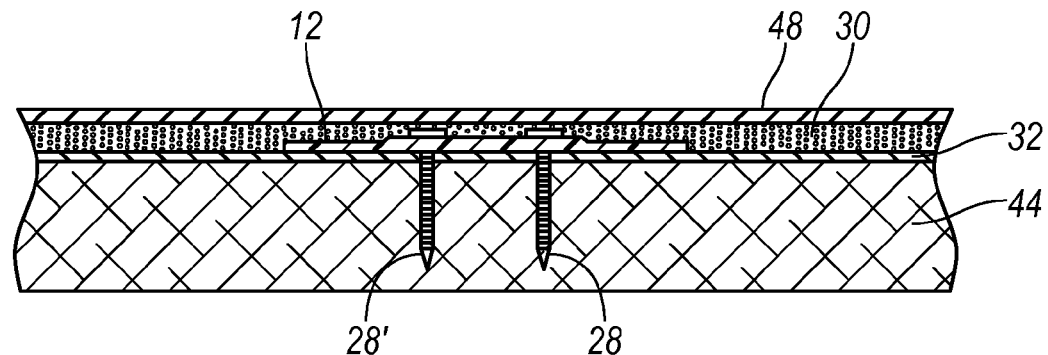
FIG. 6 is a cross-sectional side view of a multi-layer roof system adhered to a roof deck using a roofing fastener.

FIG. 3 illustrates the pair of nails 28 and 28' extending through the central region 18 of disk 12. Disk 12 is preferably made of a very tough plastic material, an example of which is impact modified Nylon 66. Nails 28 and 28' are preferably ring groove type nails having a length of 1/1 to 1 1/1 inches so that the nails can extend through the roof deck 44 to which it is affixed as illustrated in FIGS. 3 and 6. The nails 28 and 28' preferably form a very tight fit with the apertures 24 through which they extend. The holes can be formed by the nails themselves as they are driven through the center region of the disk or small pallet holes may be provided.

Preferably, a total area of the array of holes 26 formed in disk 12 is about 10% to 30% of the total plan view area of the disk assuming no holes and most preferably, the area of the holes 26 is approximately 15% of the disk area assuming not holes. The illustrated disk of FIGS. 3 and 6 has the diameter of approximately 3 inches. The central region 18 is approximately 1.2 inches in diameter. The disk central region has thickness of 0.06-0.15 inches and preferably about 0.1 inches. The surrounding annular region 20 has a thickness which tapers from a maximum of the thickness of the central region to 0.05 inches less than the central region has thickness to 0.1-0.03 inches at periphery 22. Of course, material thickness will be dependent upon the properties of the plastic selected. The tougher the plastic, the larger diameter and the thinner the disk can be fabricated. If the disk is made larger or if a less tough plastic material is utilized, the disk accordingly will be thicker. Preferably, disk 12 is made utilizing an injection molding process. As previously indicated, nails 28 and 28' may fit in a small diameter preform pilot holes or the disk center region can be made without pilot holes and the nails simply driven through the disk after the disk is molded. In the embodiment illustrated, only two nails are provided per disk, however, three or more nails may be used with the nails spaced generally evenly out from the disk center and circumferentially from one another. The three nail embodiment is illustrated in phantom outline in FIGS. 1 and 2 and shown in the FIG. 8 embodiment. In most instances, two nails are sufficient to securely adhere the disk to a roof deck.

When there is an upward wind load on the building roof system made using described fastener and assembly method the resilient disk flexes becoming slightly cup shaped causing the heads of the plurality of nails to be urged inward toward one another binding in the holes in the roof deck. The deflection of the resilient disk and the movement of the plurality of nails is shown in FIG. 3 is exaggerated for illustration purposes. By loading the two nails spaced from each other and the central axis using the resilient disk as shown pull out strength has increased to over 300% of that of a single centrally located nail of similar size and construction.

Figure 4:
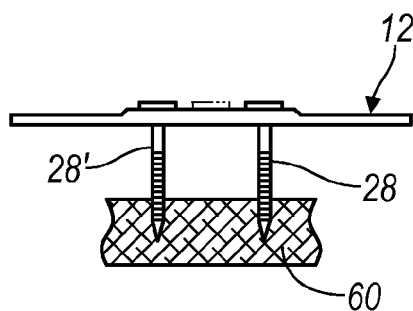
FIG. 4 is a side elevational view of yet another roofing fastener embodiment.

If a large number of roofing fasteners are placed in bulk in a shipping box, there is a risk that the nails of one roofing fastener will become entangled in the holes 26 of another disk. To reduce this risk, it is possible to mold a series of webs across the holes as illustrated in FIG. 2A, the webs are sufficiently close to prevent a nail of an adjacent roofing fastener to go through the aperture, yet, sufficiently open to allow roof sealant to past there through. An alternative structure to reduce entanglement to reduce entanglement is shown in FIG. 4. A tape bridge 50 is provided spanning the ends of nails 28 and 28'. This tape bridge can be left in place when the roofing fastener is installed, the tape simply tearing away as the nails are driven through a membrane and the adjacent roof deck. A short length of conventional adhesive tape or the like can be folded over on its self to grip and span between two or more nails as illustrated.

An alternative way of preventing roofing fasteners from becoming entangled is to carefully nest the adjacent nails with nails of one roofing fastener oriented within the holes of another. By placing the nested rows of roofing fasteners in a box and separated by sheets of paper or plastic film, roofing fasteners can be densely packed and easily removed from a shipping container.

Figure 5:
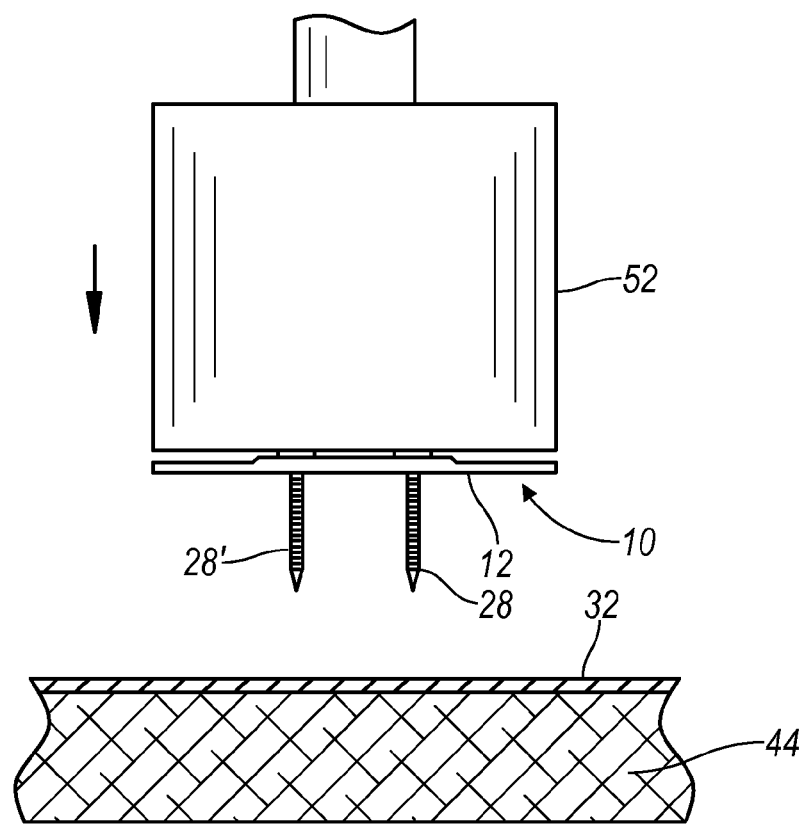
FIG. 5 is a side view of a roofing fastener being installed utilizing a magnetic hammer.
Figure 9:
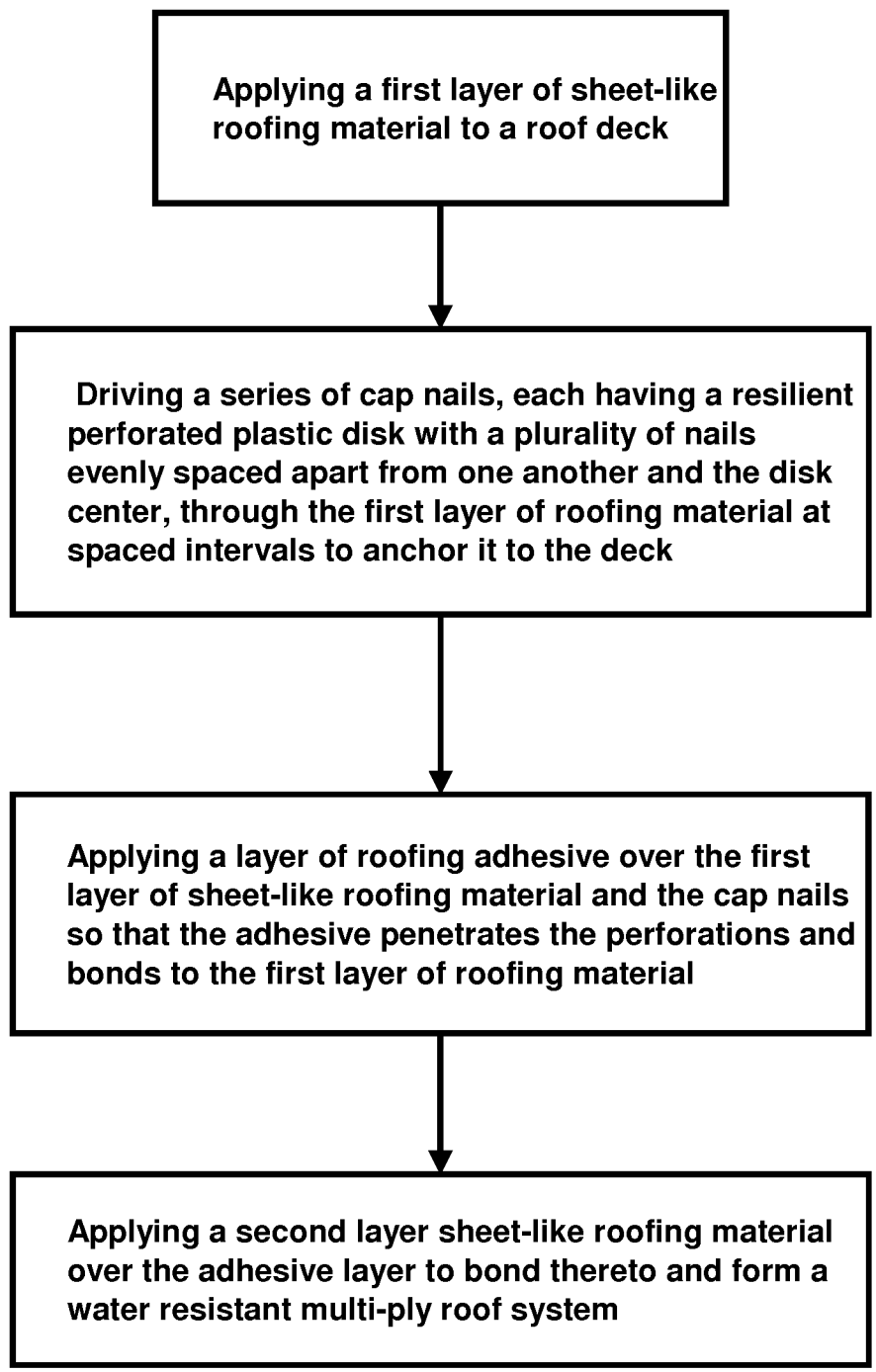
FIG. 9 illustrates a method of building a multi-layer roof system.

A building roof system can be easily installed using roofing fasteners 10 and a magnetic hammer 52 as illustrated in FIG. 5. The first membrane 32 is applied to the roof deck 44. Roofing fastener 10 is placed on the head of the hammer 52 and preferably, driven in place with a single blow. Roofing fasteners should be generally uniformly spaced along the surface of the first membrane 32 to achieve the desired anchored strength for the expected wind loads on the building. On top of the first membrane 32, which is held to the roof deck 44 by roofing fasteners 10, a layer of roof adhesive 30 such as tar or the like is applied to the desired thickness. The roof adhesive penetrates the holes 26 in the disks 12 to securely bonded to the first membrane 32. On top of the roof adhesive layer 30, a second membrane 48 is applied as illustrated in FIG. 6. The method of building a multi-layer roof system is further described in the flow chart of FIG. 9.

Figure 7:
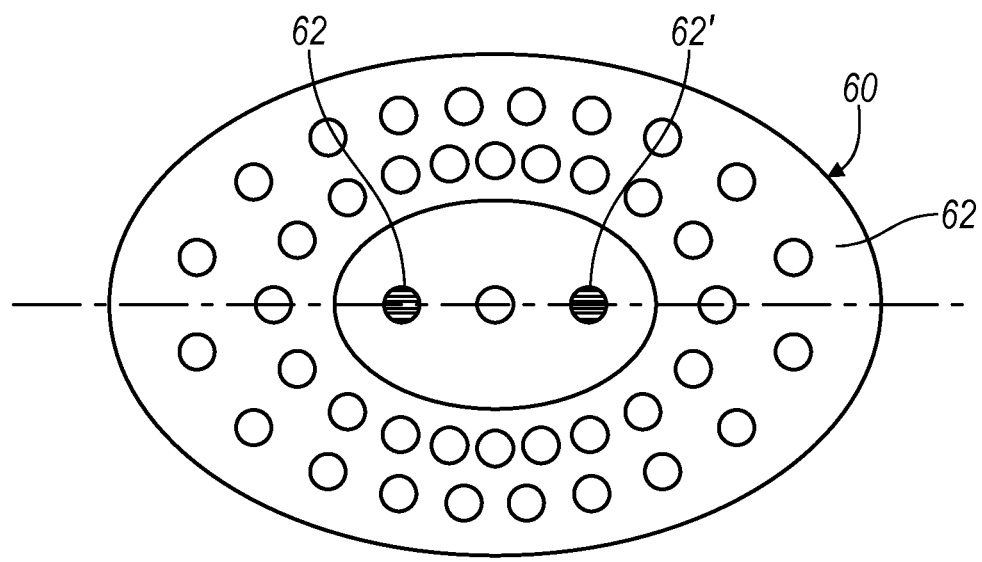
FIG. 7 is a top plan view of a second alternative roofing fastener embodiment.
Figure 8:
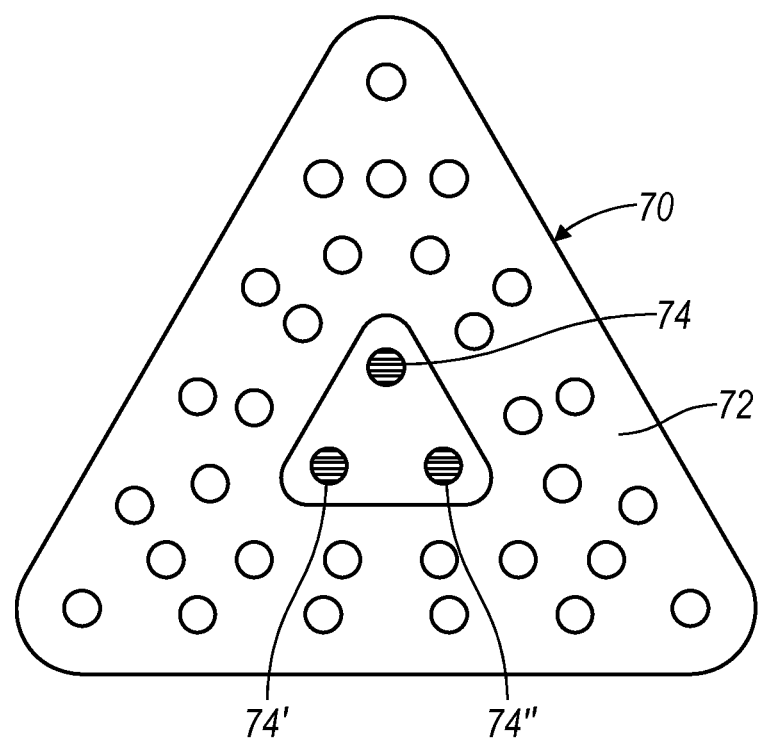
FIG. 8 is a top plan view of a third alternative roofing fastener embodiment.

Alternatively, roofing fastener 60 as shown in FIG. 7, has a disk 62 which is oval or elliptical in shape with two spaced apart two nails 64 and 64'. Another roofing fastener 70 has a disk 72 with a three lobe shaped disk 72, as shown in FIG. 8, with three nails 74, 74' and 74" The nails are evenly spaced apart from one another and the center of the disk. In two nail designs, the nails would be spaced approximately 180° apart, in a three nail design the nails would be spaced approximately 120° apart, and in a four nail design the nails would be spaced approximately 90° apart. Preferably the nails are spaced an equal distance from the disk center by about 10-20% of the maximum radial dimension of the disk, most preferable about ⅙th of the maximum radial dimension of the disk. Alternatively, the nails are spaced 20-45% of the maximum radial dimension of the disk. By spacing the nails away from the center of the disk pull out strength is improved and is more than twice that of a single nail or two nails adjacent the center. It is believed that flexing of the disk as shown in FIG. 3 causes the shanks of the nails to be side loaded binding in the hole formed in the roof deck 44.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A flexible pressure-distributing roofing fastener for securing a hot mop multi-layer roof system to a substrate, the roofing fastener comprising:
   a resilient plastic disk having flat upper and lower surfaces, an outer periphery circumaxially extending about a disk centerline, a relatively thick central region and a surrounding annular region extending between the central region to the outer periphery, the annular region having a plurality of holes extending there-through which are sized sufficiently large to allow a hot tar adhesive applied to the upper surface to flow through the holes and bond to a first layer of sheet-like roofing material; and
   two or more nails having an elongate, metal shank with a flat head at a first end and a point at a second end, the shank of each nail extending parallel to one another perpendicularly through and securely retained within apertures in the central region which are evenly spaced from one another and the disk centerline, wherein once the nails are driven into a roof deck through the first layer of roofing material, the periphery of the disk will cup upward in response to an upward force on the first layer of roofing material such that the heads of the nails will be urged together causing the nail shanks to bind to the roof deck;
   wherein, the disk has a plan view area, including the holes, of 5 to 16 square inches, and the area of the holes is 10% to 30% of the disk plan view area.

2. The roofing fastener as defined by claim 1, wherein the disk is formed of one of a group of materials including nylon, Lexan, acrylics and polycarbonates.

3. The roofing fastener as defined by claim 1, wherein the shank of the nails form a serrated ring shank.

4. The roofing fastener as defined by claim 1, wherein the shank of the nails form a screw shank.

5. The roofing fastener as defined by claim 1, further comprising at least one narrow, reinforcing web, spanning and extending diametrically across the plurality of holes in the annular region.

6. The roofing fastener as defined by claim 1, wherein the disk is formed of an impact resistant nylon.

7. The roofing fastener as defined by claim 1, wherein the disk is circular in plan view.

8. The roofing fastener as defined by claim 1, wherein the disk is oval in plan view.

9. The roofing fastener as defined by claim 1, wherein the annular region of the disk tapers downwardly from the central region toward the periphery of the disk.

10. The roofing fastener as defined by claim 1, wherein the fastener has two nails with each nail spaced from the disk centerline a distance equal to 20-45% of a maximum distance from the disk centerline to the periphery so that a roofing fastener pull out strength is more than twice that of a single nail, or more than two nails adjacent the centerline.

11. The roofing fastener as defined by claim 1, further comprising a tape bridge spanning the second ends of the nails to reduce entanglement of fasteners together.

12. The roofing fastener as defined by claim 1, wherein the area of the holes is 15% of the disk plan view area including the holes.

13. The roofing fastener as defined by claim 1, further comprising a plurality of webs extending across, and spanning, the plurality of holes to reduce entanglement of fasteners together.

14. A flexible pressure-distributing roofing fastener for securing a hot mop multi-layer roof system to a substrate, the roofing fastener comprising:
   a resilient plastic disk having flat upper and lower surfaces, an outer periphery circumaxially extending about a disk centerline, a relatively thick central region and a surrounding annular region extending between the central region to the outer periphery, the annular region having a plurality of holes extending there-through which are sized sufficiently large to allow a hot tar adhesive applied to the upper surface to flow through the holes and bond to a first layer of sheet-like roofing material; and
   two or more nails having an elongate, metal shank with a flat head at a first end and a point at a second end, the shank of each nail extending parallel to one another perpendicularly through and securely retained within apertures in the central region which are evenly spaced from one another and the disk centerline, wherein once the nails are driven into a roof deck through the first layer of roofing material, the periphery of the disk will cup upward in response to an upward force on the first layer of roofing material such that the heads of the nails will be urged together causing the nail shanks to bind to the roof deck;

wherein, the disk has a plan view area, including the holes, of 5 to 16 square inches, and the area of the holes is 15% of the disk plan view area and the disk has a plan view area, including the holes, of 5 to 16 square inches.

15. The roofing fastener as defined by claim 14, wherein the distance the two or more nails are each spaced from the disk centerline is equal to 20-45% of a maximum distance from the disk centerline center to the outer periphery, so that roofing fastener to roof deck pull out strength is more than twice that of a single nail on the centerline, and more than two nails adjacent the centerline center.

16. A flexible pressure-distributing roofing fastener for securing a hot mop multi-layer roof system to a substrate, the roofing fastener comprising:

a resilient plastic disk having flat upper and lower surfaces, an outer periphery circumaxially extending about a disk centerline, a relatively thick central region and a surrounding annular region extending between the central region to the outer periphery, the annular region having a plurality of holes extending there-through, which have a total area of 10% to 30% of a plan view area of the disk, to allow a hot tar adhesive applied to the upper surface to flow through the holes and bond to a first layer of sheet-like roofing material; and two or more nails having an elongate, metal shank with a flat head at a first end and a point at a second end, the shank of each nail extending parallel to one another perpendicularly through and securely retained within apertures in the central region which are evenly spaced from one another and the disk centerline a distance so that the nails once driven into a roof deck through the first layer of roofing material cause the periphery of the disk to cup upward in response to an upward force on the first layer of roofing material, urging the heads of the nails together causing the nail shanks to bind to the roof deck;

wherein the distance the two or more nails are each spaced from the disk centerline is equal to 20-45% of a maximum distance from the disk centerline center to the outer periphery, so that roofing fastener to roof deck pull out strength is more than twice that of a single nail on the centerline, and more than two nails adjacent the centerline center.

17. The roofing fastener as defined by claim 16, wherein the area of the holes is 15% of the disk plan view area.

18. The roofing fastener as defined by claim 16, wherein the disk has a plan view area, including the holes, of 5 to 16 square inches.

19. The roofing fastener as defined by claim 16, wherein the thickness of the annular region of the disk tapers downwardly from the central region toward the periphery of the disk.

20. The roofing fastener as defined by claim 16, wherein the shank of the nails form a serrated ring shank.

\* \* \* \* \*